United States Patent
Katoh

(10) Patent No.: US 7,301,581 B2
(45) Date of Patent: Nov. 27, 2007

(54) TELEVISION RECEIVER AND METHOD FOR RECEIVING BROADCAST SIGNAL

(75) Inventor: Yukiko Katoh, Osaka (JP)

(73) Assignee: Matsushita Electric Industrial Co., Ltd., Kadoma-shi (JP)

(*) Notice: Subject to any disclaimer, the term of this patent is extended or adjusted under 35 U.S.C. 154(b) by 719 days.

(21) Appl. No.: 10/069,521

(22) PCT Filed: Jul. 9, 2001

(86) PCT No.: PCT/JP01/05952

§ 371 (c)(1),
(2), (4) Date: Mar. 5, 2002

(87) PCT Pub. No.: WO02/05551

PCT Pub. Date: Jan. 17, 2002

(65) Prior Publication Data

US 2002/0113906 A1 Aug. 22, 2002

(30) Foreign Application Priority Data

Jul. 10, 2000 (JP) .............................. 2000-208082
Jul. 4, 2001 (JP) .............................. 2001-203752

(51) Int. Cl.
*H04N 7/00* (2006.01)
(52) U.S. Cl. ...................... 348/473; 348/553; 348/554; 348/706
(58) Field of Classification Search ............... 348/500, 348/553, 725, 555, 554, 461, 467, 462, 473, 348/564–565, 563
See application file for complete search history.

(56) References Cited

U.S. PATENT DOCUMENTS 5,440,351 A   8/1995   Ichino ........................ 348/729
5,602,598 A * 2/1997   Shintani ..................... 348/565

FOREIGN PATENT DOCUMENTS

| JP | 57-45712 | | 3/1982 |
| JP | 57-188184 | * | 11/1982 |
| JP | 2-211762 | | 8/1990 |
| JP | 2-218226 | | 8/1990 |
| JP | 8-275073 | | 10/1996 |
| JP | 10-13192 | | 1/1998 |
| JP | 10-51706 | | 2/1998 |
| JP | 2000-106657 | * | 4/2000 |
| WO | WO99/11065 | | 3/1999 |

OTHER PUBLICATIONS

European Patent Office Communication for corresponding European patent Office Application No. 01947938 dated Mar. 24, 2005.

* cited by examiner

*Primary Examiner*—Trang U. Tran
(74) *Attorney, Agent, or Firm*—Kratz, Quintos & Hanson, LLP

(57) ABSTRACT

A ground wave video signal is extracted by a ground wave video decoder from a ground wave broadcast signal received by a ground wave tuner. A BS program link information signal is extracted by a BS program link information decoder from a BS broadcast signal received by a BS2 tuner. An AM radio sound signal is extracted by a radio sound decoder from an AM radio broadcast signal received by an AM radio tuner. The extracted ground wave video signal and BS program link information signal are displayed as videos by a display device, while the extracted AM radio sound signal is output as a sound from a speaker.

15 Claims, 10 Drawing Sheets

TELEVISION RECEIVER AND METHOD FOR RECEIVING BROADCAST SIGNAL

BACKGROUND OF THE INVENTION

1. Field of the Invention

The present invention relates to a television receiver through which a viewer can view a video and program link information and can listen to a sound, and to a method of receiving a broadcast signal.

2. Description of the Related Art

FIG. 10 is a block diagram showing the structure of a conventional television receiver.

With reference to FIG. 10, a television receiver 300 is constituted by a remote control signal receiver 55, a microcomputer 56, a synthesizing processor 60, a sound decoder 90, a program link information decoder 91, a video decoder 92, an AV (Audio Video) input switching unit 93, a tuner controller 94, a display device 95 and a speaker 96.

The microcomputer 56 includes a remote control code analyzer 57, a channel selection controller 58 and a program link information drawing data producer 59.

The sound decoder 90 includes a ground wave sound decoder 90a, a BS (broadcast satellite) sound decoder 90b, a CS (communication satellite) sound decoder 90c and a radio sound decoder 90d.

The program link information decoder 91 includes a ground wave program link information decoder 91a, a BS program link information decoder 91b and a CS program link information decoder 91c.

The video decoder 92 includes a ground wave video decoder 92a, a BS video decoder 92b and a CS video decoder 92c.

The tuner controller 94 includes an AM (amplitude modulation) radio tuner 94a, an FM (frequency modulation) radio tuner 94b, a ground wave tuner 94c, a BS tuner 94d and a CS tuner 95e.

The tuner controller 94 supplies an instruction for receiving a broadcast signal to any one of the AM radio tuner 94a, the FM radio tuner 94b, the ground wave tuner 94c, the BS tuner 94d and the CS tuner 95e on the basis of a control signal from the channel selection controller 58 which will be described later.

The AM radio tuner 94a receives an AM radio broadcast signal through an antenna 97 to output the received AM radio broadcast signal to a contact SW75 of the AV input switching unit 93. The FM radio tuner 94b receives an FM radio broadcast signal through the antenna 97 to output the received FM radio broadcast signal to a contact SW76 of the AV input switching unit 93. The ground wave tuner 94c receives a ground wave broadcast signal through the antenna 97 to output the received ground wave broadcast signal to a contact SW77 of the AV input switching unit 93. The BS tuner 94d receives a BS broadcast signal through the antenna 97 to output the received BS broadcast signal to a contact 78 of the AV input switching unit 93. The CS tuner 94e receives a CS broadcast signal through the antenna 97 to output the received CS broadcast signal to a contact SW79 of the AV input switching unit 93.

The AV input switching unit 93 switches a switch X to one of the contacts SW75 to SW79 to output any one of the AM radio broadcast signal, the FM radio broadcast signal, the ground wave broadcast signal, the BS broadcast signal and the CS broadcast signal applied from the tuner controller 94 to the sound decoder 90, the program link information decoder 91 and the video decoder 92.

In the sound decoder 90, the ground wave sound decoder 90a decodes the ground wave broadcast signal applied from the AV input switching unit 93 so as to extract a ground wave sound signal and output the same to the speaker 96. The BS sound decoder 90b decodes the BS broadcast signal applied from the AV input switching unit 93 so as to extract a BS sound signal and output the same to the speaker 96.

The CS sound decoder 90c decodes the CS broadcast signal applied from the AV input switching unit 93 so as to extract a CS sound signal and output the same to the speaker 96. The radio sound decoder 90d decodes the AM radio broadcast signal or the FM radio broadcast signal applied from the AV input switching unit 93 so as to extract a radio sound signal and output the same to the speaker 96.

The speaker 96 outputs the sound signal applied from the sound decoder 90 as a sound.

In the program link information decoder 91, the ground wave program link information decoder 91a decodes the ground wave broadcast signal applied from the AV input switching unit 93 so as to extract a ground wave program link information signal and output the same to the program link information drawing data producer 59. The BS program link information decoder 91b decodes the BS broadcast signal applied from the AV input switching unit 93 so as to extract a BS program link information signal and output the same to the program link information drawing data producer 59. The CS program link information decoder 91c decodes the CS broadcast signal applied from the AV input switching unit 93 so as to extract a CS program link information signal and output the same to the program link information drawing data producer 59.

In the video decoder 90, the ground wave video decoder 92a decodes the ground wave broadcast signal applied from the AV input switching unit 93 to extract a ground wave video signal and output the same to the synthesizing processor 60. The BS video decoder 92b decodes the BS broadcast signal applied from the AV input switching unit 93 so as to extract a BS video signal and output the same to the synthesizing processor 60. The CS video decoder 92c decodes the CS broadcast signal applied from the AV input switching unit 93 so as to extract a CS video signal and output the same to the synthesizing processor 60.

A remote controller 400 is employed for transmitting an instruction of each operation such as channel selection, adjustment of videos and sounds and the like as infrared rays.

When a user presses a desired channel selection button out of a plurality of selection buttons, a remote control signal corresponding to the pressed channel selection button is transmitted to the remote control signal receiver 55 of the television receiver 300. The remote control signal receiver 55 receives the remote control signal to apply the same to the microcomputer 56.

In the microcomputer 56, the remote control code analyzer 57 analyzes the remote control signal applied from the remote control signal receiver 55 to output instruction information to the channel selection controller 58. The channel selection controller 58 controls the AV input switching unit 93 on the basis of the instruction information. The program link information drawing data producer 59 produces drawing data of program link information on the basis of the program link information signal applied from the program link information decoder 91.

The synthesizing processor 60 synthesizes the video signal applied from the video decoder 92 and the drawing data of program link information applied from the program link information drawing data producer 59 and displays a synthetic video signal on the display device 95. The display device 95 outputs the applied synthetic video signal as a video.

When a user views a program on the television receiver 300, the user presses the channel of the program that he or she wants to view through the remote controller 400. The remote controller 400 transmits a remote control signal including a channel selection instruction for selecting the pressed channel to the remote control signal receiver 55.

The remote control signal receiver 55 outputs the received remote control signal to the remote control code analyzer 57. The remote control code analyzer 57 analyzes the applied remote control signal to output a channel selection instruction signal to the channel selection controller 58. The channel selection controller 58 controls the AV input switching unit 93 and the tuner controller 94 on the basis of the applied channel selection instruction signal.

In the case of a channel selection instruction signal selecting the channel of a program that is broadcast on a BS 10 channel, for example, the channel selection controller 58 applies a control signal that switches the switch X to the contact SW78 to the AV input switching unit 93. Also, the channel selection controller 58 applies to the tuner controller 94 a control signal that receives a BS broadcast signal of the BS 10 channel from the BS tuner 94*d*.

The BS tuner 94*d* receives the BS broadcast signal of the BS 10 channel through the antenna 97 to output the same to the AV input switching unit 93. The AV input switching unit 93 outputs the BS broadcast signal of the BS 10 channel to the BS sound decoder 90*b*, the BS program link information decoder 91*b* and the BS video decoder 92*b*.

The BS sound decoder 90*b* decodes the BS broadcast signal of the BS 10 channel so as to extract a BS sound signal of the BS 10 channel and output the same to the speaker 96. The speaker 96 outputs the BS sound signal of the BS 10 channel as a sound.

The BS program link information decoder 91*b* decodes the BS broadcast signal of the BS 10 channel so as to extract a BS program link information signal of the BS 10 channel and output the same to the program link information drawing data producer 59. The program link information drawing data producer 59 produces drawing data of program link information on the basis of the applied BS program link information signal of the BS 10 channel to output the same to the synthesizing processor 60. The BS video decoder 92*b* decodes the BS broadcast signal of the BS 10 channel so as to extract a BS video signal of the BS 10 channel and output the same to the synthesizing processor 60 of the BS 10 channel.

The synthesizing processor 60 synthesizes the BS video signal of the BS 10 channel and the program link information drawing data of the BS 10 channel to output a synthetic video signal of the BS 10 channel to the display device 95. The display device 95 displays the synthetic video signal of the BS 10 channel as a video.

Thus, the user can view the program of the selected BS 10 channel.

In the television receiver 300 shown in FIG. 10, however, a broadcast signal that can be output to the sound decoder 90, the program link information decoder 91 and the video decoder 92 is only the broadcast signal received by any one of the AM radio tuner 94*a*, the FM radio tuner 94*b*, the ground wave tuner 94*c*, the BS tuner 94*d* and the CS tuner 94*e* in the tuner controller 94.

Therefore, it is impossible for a viewer to individually select a video, a sound and program link information of the program that he or she wants to view, receive such a video, sound and program link information from different broadcasting stations and view the program in a combination of those individually selected and received video, sound and program link information.

When the viewer is viewing a broadcast program of a baseball match by relay, for example, if it is difficult for him or her to understand a baseball commentator's running commentary, then he or she views a video appeared appearing on a television receiver and simultaneously listens to the sound of a running commentary on the same baseball match received on a radio by minimizing the volume of the sound output from the speaker of the television receiver and by using the radio.

If the viewer views the video appearing on the television receiver and listens to the sound of the running commentary received on the radio at the same time, however, disagreement occurs between the video on the television receiver and the sound from the radio in the case where either a program received on the television receiver or the one received on the radio changes to a CM (commercial) break.

Moreover, if the viewer cannot see a score or positions displayed on a screen well, in the conventional television receiver, it is impossible to view the score or positions by changing the program link information of the baseball match to the one of the same baseball match being broadcast by another broadcasting station and synthesizing the video of the program being viewed at present and the program link information of the program broadcast by another broadcasting station.

SUMMARY OF THE INVENTION

An object of the present invention is to provide a television receiver and a broadcast signal receiving method through which a viewer can easily select a video, a sound and program link information individually from different broadcast programs and combine the selected ones to view.

A television receiver according to one aspect of the present invention includes first selection means for selecting a broadcast signal for display of a video, second selection means for selecting a broadcast signal for output of a sound, third selection means for selecting a broadcast signal for display of program link information, receiving means for receiving broadcast signals selected by the first, second and third selection means as first, second and third broadcast signals, respectively, signal extraction means for extracting a video signal, a sound signal and program link information, respectively, from the first, second and third broadcast signals received by the receiving means, a display device that displays the video signal and the program link information signal extracted by the signal extraction means as a video, and a sound output device that outputs the sound signal extracted by the signal extraction means as a sound.

In the television receiver in accordance with the present invention, the broadcast signal for display of a video, which is selected by the first selection means, is received as the first broadcast signal by the receiving means, and the video signal is extracted from the first broadcast signal by the signal extraction means. The broadcast signal for output of a sound, which is selected by the second selection means, is received as the second broadcast signal by the receiving means, and the sound signal is extracted from the second broadcast signal by the signal extraction means. The broadcast signal for display of program link information, which is selected by the third selection means, is received as the third broadcast signal by the receiving means, and program link information is extracted from the third broadcast signal by the signal extraction means.

The video signal and the program link information signal extracted by the signal extraction means are displayed as videos by the display device, and the sound signal extracted by the signal extraction means is output as a sound by the sound output device.

Consequently, a user can easily select and combine, for viewing, the video selected by the first selection means, the program link information selected by the third selection means and the sound selected by the second selection means individually from different broadcast programs.

The receiving means may include first receiving means for receiving the broadcast signal selected by the first selection means as a first broadcast signal, second receiving means for receiving the broadcast signal selected by the second selection means as a second broadcast signal and third receiving means for receiving the broadcast signal selected by the third selection means as a third broadcast signal; the signal extraction means may include video signal extraction means for extracting a video signal from the first broadcast signal received by the first receiving means, sound signal extraction means for extracting a sound signal from the second broadcast signal received by the second receiving means and program link information signal extraction means for extracting a program link information signal from the third broadcast signal received by the third receiving means.

In that case, the broadcast signal selected by the first selection means is received as the first broadcast signal by the first receiving means, and the video signal is extracted from the first broadcast signal by the video signal extraction means. The broadcast signal selected by the second selection means is received as the second broadcast signal by the second receiving means, and the sound signal is extracted from the second broadcast signal by the sound signal extraction means. The broadcast signal selected by the third selection means is received as the third broadcast signal by the third receiving means, and the program link information signal is extracted from the third broadcast signal by the program link information signal extraction means.

In that case, a user can combine, for viewing, the video obtained by the first receiving means and the video signal extraction means, the sound obtained by the second receiving means and the sound signal extraction means and the program link information obtained by the third receiving means and the program link information extraction means.

The first receiving means may include a plurality of first tuners that receive broadcast signals of the same or different broadcast systems; the second receiving means may include a plurality of second tuners that receive broadcast signals of the same or different broadcast systems; the third receiving means may include a plurality of third tuners that receive broadcast signals of the same or different broadcast systems; the video signal extraction means may include a plurality of first decoders that extract video signals respectively from the broadcast signals of the same or different broadcast systems received by the plurality of the first tuners; the sound signal extraction means may include a plurality of second decoders that extract video signals respectively from the broadcast signals of the same or different broadcast systems received by the plurality of second tuners; the program link information extraction means may include a plurality of third decoders that extract program link information signals respectively from the broadcast signals of the same or different broadcast systems received by the plurality of third tuners.

In that case, the broadcast signals of the same or different broadcast systems are received by the plurality of first tuners, and the video signals are extracted from the broadcast signals of the same or different broadcast systems by the plurality of first decoders. The broadcast signals of the same or different broadcast systems are received by the plurality of second tuners, and the sound signals are extracted from the broadcast signals of the same or different broadcast systems by the plurality of second decoders. The broadcast signals of the same or different broadcast systems are received by the plurality of third tuners, and the program link information signals are extracted from the broadcast signals of the same of different broadcast systems by the plurality of third decoders.

This makes it possible for a viewer to easily select a video, a sound and program link information from individually different broadcast programs being broadcast in the same or different broadcast systems, and combine the individually selected ones to view.

The first receiving means may include at least one of a ground wave broadcast tuner that receives a ground wave broadcast signal and a satellite broadcast tuner that receives a satellite broadcast signal; the second receiving means may include at least one of a ground wave broadcast tuner that receives a ground wave broadcast signal, a satellite broadcast tuner that receives a satellite broadcast signal and a radio broadcast tuner; the plurality of third receiving means may include at least one of a ground wave broadcast tuner that receives a ground wave signal and a satellite broadcast tuner that receives a satellite broadcast signal; the video signal extraction means may include at least one of a ground wave broadcast video decoder and a satellite broadcast video decoder provided corresponding to the ground wave broadcast tuner or the satellite broadcast tuner; the sound signal extraction means may include at least one of a ground wave broadcast sound decoder, a satellite broadcast sound decoder and a radio broadcast sound decoder provided corresponding to the ground wave broadcast tuner, the satellite broadcast tuner or the radio broadcast tuner; the program link information signal extraction means may include at least one of a ground wave broadcast program link information decoder and a satellite broadcast program link information decoder provided corresponding to the ground wave broadcast tuner or the satellite broadcast tuner.

In that case, the broadcast signal for display of a video is received by either the ground wave broadcast tuner or the satellite broadcast tuner, and the video signal is extracted by either the ground wave broadcast video decoder or the satellite broadcast video decoder provided corresponding to the ground wave broadcast tuner or the satellite broadcast tuner. The broadcast signal for output of a sound is received by one of the ground wave broadcast tuner, the satellite broadcast tuner and the radio broadcast tuner, and the sound signal is extracted by one of the ground wave broadcast sound decoder, the satellite broadcast sound decoder and the radio broadcast sound decoder provided corresponding to the ground wave broadcast tuner, the satellite broadcast tuner or the radio broadcast tuner. The broadcast signal for display of program link information is received by either the ground wave broadcast tuner or the satellite broadcast tuner, and the program link information signal is extracted by either the ground wave broadcast program link information decoder or the satellite broadcast program link information decoder provided corresponding to the ground wave broadcast tuner or the satellite broadcast tuner.

This makes it possible for the user to select a video and program link information from programs being broadcast on the ground wave broadcast or the satellite broadcast and select a sound from a program being broadcast on any one of the ground wave broadcast, the satellite broadcast and the radio broadcast; accordingly, the user can easily select the selected video sound and program link information individually from the broadcast programs of the same or different broadcast systems and combine those individually selected ones to view.

The television receiver may further include program information storing means for storing program information of a program to be broadcast and same-content-program searching means for searching for programs of the same content as that of the program to be broadcast on the basis of the program information stored in the program information storing means.

In this case, the programs of the same content are searched by the-same-content-program searching means on the basis of the program information of the program to be broadcast, which is stored in the program information storing means.

This makes it possible for the user to easily select a video, a sound and program link information from the programs of the same content and combine the selected ones to view.

The television receiver may further include same-content-program display control means for displaying on a display device the programs of the same content searched by the-same-content-program searching means.

In that case, the programs of the same content searched by the-same-content-program searching means are displayed on the display device. Accordingly, the user can easily select and combine a video, a sound and program link information on the basis of the programs of the same content as that of the program that the user is viewing, displayed on the display device.

The television receiver may further include same-content-program selection control means for controlling the selecting operation conducted by the first, second and third selection means on the basis of the programs of the same content displayed by the-same-content-program display control means.

In this case, the selecting operation by the first, second and third selection means is controlled by the-same-content-program selection control means on the basis of the programs of the same content displayed on the display device. Accordingly, the user can easily select and combine a video, a sound and program link information to be viewed on the basis of the programs of the same content as that of the program being viewed, which are displayed on the display device.

The television receiver may further include broadcast signal coincidence control means for controlling the first and second selection means so that the first broadcast signal and the second broadcast signal received by the receiving means become coincident with each other when the program based on the first or second broadcast signal changes to a commercial break.

In this case, when the program based on the first or second broadcast signal being received by the receiving means changes to a commercial break, the broadcast signal coincidence control means can make the first and second broadcast signals coincident with each other.

This makes it possible to prevent disagreement between a video and a sound caused by the change of the broadcast program of the video or the sound to the commercial break in the case where the user is viewing by selecting the video and the sound individually from different broadcast programs.

The television receiver may further include setting means for setting the television receiver in a mode that the video and the sound of a commercial break are output or a mode that those of a program are output when the program based on the first or second broadcast signal received by the receiving means changes to the commercial break. The broadcast signal coincidence control means may control the first and second selection means so that the first and second broadcast signals become coincident with each other in accordance with the set mode.

In this case, when the program based on the first or second broadcast signal received by the receiving means changes to the commercial break, it is possible to set the television receiver in either the mode that the video and the sound of the commercial break are output or the mode that those of the program are output.

Accordingly, when the broadcast program of the video or the sound changes to the commercial break, the user can select and set the television receiver in either the mode that the video and the sound of the commercial break are output or the mode that those of the program are output.

A method of receiving a broadcast signal according to another aspect of the present invention includes the steps of: selecting a broadcast signal for display of a video; selecting a broadcast signal for output of a sound; selecting a broadcast signal for display of program link information; receiving the broadcast signal for display of the video, the broadcast signal for output of the sound and the broadcast signal for display of the program link information as first, second and third broadcast signals, respectively; extracting a video signal, a sound signal and program link information from the received first, second and third broadcast signals, respectively; displaying the extracted video signal and program link information signal as videos; and outputting the received sound signal as a sound.

In the broadcast signal receiving method according to the present invention, the selected broadcast signal for display of a video is received as the first broadcast signal, and the video signal is extracted from the first broadcast signal. The selected broadcast signal for output of a sound is received as the second broadcast signal, and the sound signal is extracted from the second broadcast signal. The selected broadcast signal for display of program link information is received as the third broadcast signal, and the program link information is extracted from the third broadcast signal.

The extracted video signal and program link information signal are displayed as videos, and the sound signal is output as a sound.

Consequently, a user can easily select the selected video, program link information and sound individually from different broadcast programs and combine the selected ones to view.

The broadcast signal receiving method may further include the steps of storing program link information of a program to be broadcast, and searching for programs of the same content on the basis of the stored program link information.

In that case, the programs of the same content are searched for on the basis of the stored program link information of the program to be broadcast.

This makes it possible for a user to easily select a video, a sound and program link information from the programs of the same content and combine the selected ones to view.

The broadcast signal receiving method may further include the step of displaying the searched programs of the same content.

In this case, the searched programs of the same content are displayed. Accordingly, the user can easily select a video, a sound and program link information on the basis of the displayed programs of the same content and combine the selected ones to view.

The broadcast signal receiving method may further include the step of controlling a selecting operation of broadcast signals on the basis of the displayed programs of the same content.

In this case, the selecting operation of broadcast signals is controlled on the basis of the displayed programs of the same content. This makes it possible for the user to more easily select a video, a sound and program link information on the basis of the displayed programs of the same content and combine the selected ones to view.

The broadcast signal receiving method may further include the step of controlling the selecting operation of broadcast signals so that when the program based on the first or second broadcast signal being received changes to a commercial break, the first and second broadcast signals become coincident with each other.

In that case, when the program based on the first or second broadcast signal changes to the commercial break, the first and second broadcast signals can be coincident with each other.

This makes it possible to prevent the disagreement between a video and a sound caused by the change of the broadcast program of the video or the sound into the commercial break in the case where the user is viewing by individually selecting the video and the sound from the different broadcast programs.

The broadcast signal receiving method may further include the step of setting the television receiver in a mode that the video and the sound of the commercial break are output or a mode that the video and the sound of the program based on the first or second broadcast signal being received are output when that program changes to the commercial break. The step of controlling the selecting operation of broadcast signals may further include the step of controlling the broadcast signals so that the first and second broadcast signals become coincident with each other in accordance with the set mode.

In that case, when the program based on the first or second broadcast signal being received changes to the commercial break, either the mode that the video and the sound of the commercial break are output or the mode that those of the program are output can be set.

Accordingly, when the broadcast program of the video or the sound changes to the commercial break, the user can select and set either the mode that the video and the sound of the commercial break are output or the mode that those of the program are output.

According to the present invention, the user can easily select a video, program link information and a sound individually from different broadcast programs and combine the selected ones to view.

DETAILED DESCRIPTION OF THE PREFERRED EMBODIMENTS

Figure 1:
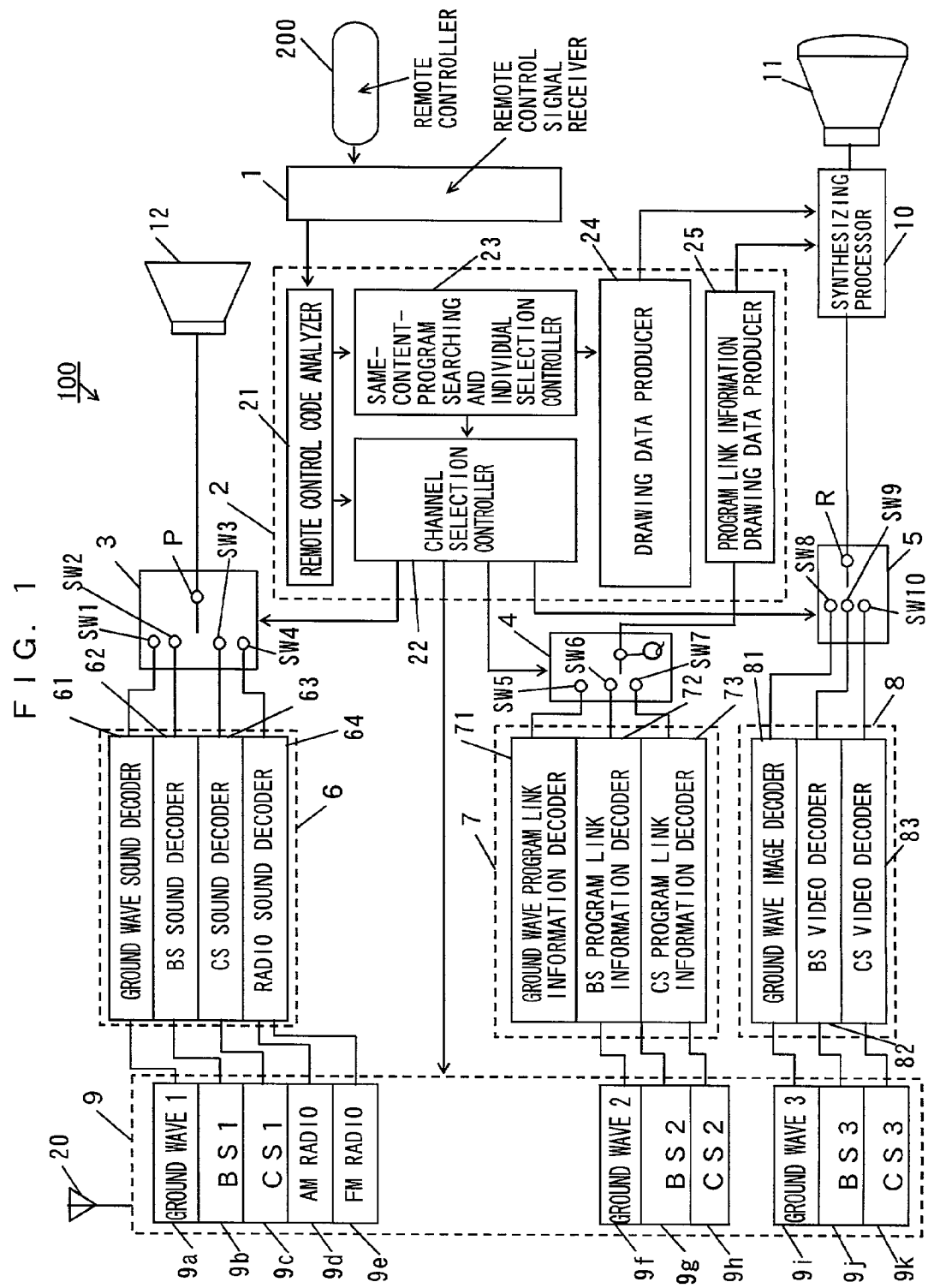
FIG. 1 is a block diagram showing the structure of a television receiver according to a first embodiment of the present invention.

FIG. 1 is a block diagram showing the structure of a television receiver according to a first embodiment of the present invention.

With reference to FIG. 1, a television receiver 100 includes a remote control signal receiver 1, a microcomputer 2, a sound switching unit 3, a program link information switching unit 4, a video switching unit 5, a sound decoder 6, a program link information decoder 7, a video decoder 8, a tuner controller 9, a synthesizing processor 10, a display device 11 and a speaker 12.

The microcomputer 2 includes a remote control code recognizing unit 21, a channel selection controller 22, a same-content-program searching and individual selection controller 23, a drawing data producer 24 and a program link information drawing data producer 25.

The sound decoder 6 includes a ground wave sound decoder 61, a BS sound decoder 62, a CS sound decoder 63 and a radio sound decoder 64. The program link information decoder 7 includes a ground wave program link information decoder 71, a BS program link information decoder 72 and a CS program link information decoder 73. The video decoder 8 includes a ground wave video decoder 81, a BS video decoder 82 and a CS video decoder 83.

The tuner controller 9 includes a ground wave 1 tuner 9a, a ground wave 2 tuner 9b, a ground wave 2 tuner 9c, a BS1 tuner 9d, a BS2 tuner 9e, a BS3 tuner 9f, a CS1 tuner 9g, a CS2 tuner 9h, a CS3 tuner 9i, an AM radio tuner 9j and an FM radio tuner 9k.

The ground wave 1 tuner 9a receives a ground wave broadcast signal through an antenna 1 to apply the received signal to the ground wave sound decoder 61. The ground wave sound decoder 61 carries out a given processing for the ground wave broadcast signal to extract a ground wave sound signal and apply the same to a contact SW1 of the sound switching unit 3.

The BS1 tuner 9b receives a BS broadcast signal through the antenna 1 to apply the received broadcast signal 2 to the BS sound decoder 62. The BS sound decoder 62 decodes the BS broadcast signal so as to extract a BS sound signal and apply the same to a contact SW2 of the sound switching unit 3.

The CS1 tuner 9c receives a CS broadcast signal through the antenna 1 to apply the received CS broadcast signal to the CS sound decoder 63. The CS sound decoder 63 carries out a given processing for the CS broadcast signal to extract a CS sound signal and apply the same to a contact SW3 of the sound switching unit 3.

The AM radio tuner 9d receives an AM radio broadcast signal through the antenna 1 to apply the received AM radio broadcast signal to the radio sound decoder 64. The radio sound decoder 64 decodes the AM radio broadcast signal so as to extract an AM radio sound signal and apply the same to a contact SW4 of the sound switching unit 3.

The FM radio tuner 9e receives an FM radio broadcast signal through the antenna 1 to apply the received FM radio broadcast signal to the radio sound decoder 64. The radio sound decoder 64 decodes the FM radio broadcast signal so as to extract an FM radio broadcast signal and apply the same to a contact SW4 of the sound switching unit 3.

The sound switching unit 3 switches a switch P to any of the contacts SW1 to SW4 on the basis of a control signal from the channel selection controller 22 which will be described later, and outputs a sound signal applied from any one of the ground wave sound decoder 61, the BS sound decoder 62, the CS sound decoder 63 and the radio sound decoder 64 to the speaker 12. The speaker 12 outputs the applied sound signal as a sound.

The ground wave 2 tuner 9f receives a ground wave broadcast signal through the antenna 1 to apply the received ground wave broadcast signal to the ground wave program link information decoder 71. The ground wave program link information decoder 71 decodes the ground wave broadcast signal so as to extract a ground wave program link information signal and apply the same to a contact SW5 of the program link information switching unit 4.

The BS2 tuner 9g receives a BS broadcast signal through the antenna 1 to apply the received BS broadcast signal to the BS program link information decoder 72. The BS program link information decoder 72 decodes the BS broadcast signal so as to extract a BS program link information signal and apply the same to a contact SW6 of the program link information switching unit 4.

The CS2 tuner 9h receives a CS broadcast signal through the antenna 1 to apply the received CS broadcast signal to the CS program link information decoder 73. The CS program link information decoder 73 decodes the CS broadcast signal so as to extract a CS program link information signal and apply the same to a contact SW7 of the program link information switching unit 4.

The program link information switching unit 4 switches a switch Q to any of the contacts SW5 to SW7 on the basis of a control signal from the channel selection controller 22 which will be described later, and outputs a program link information signal applied from any of the ground wave program link information decoder 71, the BS program link information decoder 72 and the BS program link information decoder to the program link information drawing data producer 25. The program link information drawing data producer 25 produces program link information drawing data on the basis of the applied program link information signal to output the produced data to the synthesizing processor 10.

The ground wave 3 tuner 9i receives a ground wave broadcast signal through the antenna 1 to apply the received ground wave broadcast signal to the ground wave video decoder 81. The ground wave video decoder 81 decodes the ground wave broadcast signal so as to extract a ground wave video signal and apply the same to a contact SW8 of the video switching unit 5.

The BS3 tuner 9j receives a BS broadcast signal through the antenna 1 to apply the received BS broadcast signal to the BS video decoder 82. The BS video decoder 82 decodes the BS broadcast signal so as to extract a BS video signal and apply the same to a contact SW9 of the video switching unit 5.

The CS3 tuner 9k receives a CS broadcast signal through the antenna 1 to apply the received CS broadcast signal to the CS video decoder 83. The CS video decoder 83 decodes the CS broadcast signal so as to extract a CS video signal and apply the same to a contact SW10 of the video switching unit 5.

The video switching unit 5 switches a switch R to any of the contacts SW8 to SW10 on the basis of a control signal from the channel selection controller 22 which will be described later, and outputs a video signal applied from any of the ground wave video decoder 81, the BS video decoder 82 and the CS video decoder 83 to the synthesizing processor 10.

The synthesizing processor 10 synthesizes the program link information drawing data applied from the program link information drawing data producer 25, the video signal applied from the video signal switching unit 5 and the drawing data applied from the drawing data producer 24 which will be described later, so as to output a synthetic video signal to the display device 11. The display device 11 outputs the synthetic video signal as a synthetic video.

A remote controller 200 attached to the television receiver 100 transmits a remote control signal for instructing each of such operations as channel selection, adjustments of a video and a sound and the like in the television receiver 100 in accordance with a user's operation.

The remote control signal receiver 1 receives the remote control signal transmitted from the remote controller 200 to apply the same to the microcomputer 2.

In the microcomputer 2, the remote control code analyzer 21 analyzes the remote control signal applied from the remote control signal receiver 1 to output an instruction signal to the channel selection controller 22 and the same-content-program searching and individual selection controller 23 on the basis of analyzed instruction information.

The channel selection controller 22 controls the sound switching unit 3, the program link information switching unit 4, the videoswitching unit 5 and the tuner controller 9 on the basis of the applied instruction signal. The same-content-program searching and individual selection controller 23 searches for programs of the same content on the basis of program information stored in a memory incorporated in the microcomputer. The drawing data producer 24 produces drawing data of a screen showing a list of the programs of the same content and drawing data of an individual selection screen.

Figure 2:
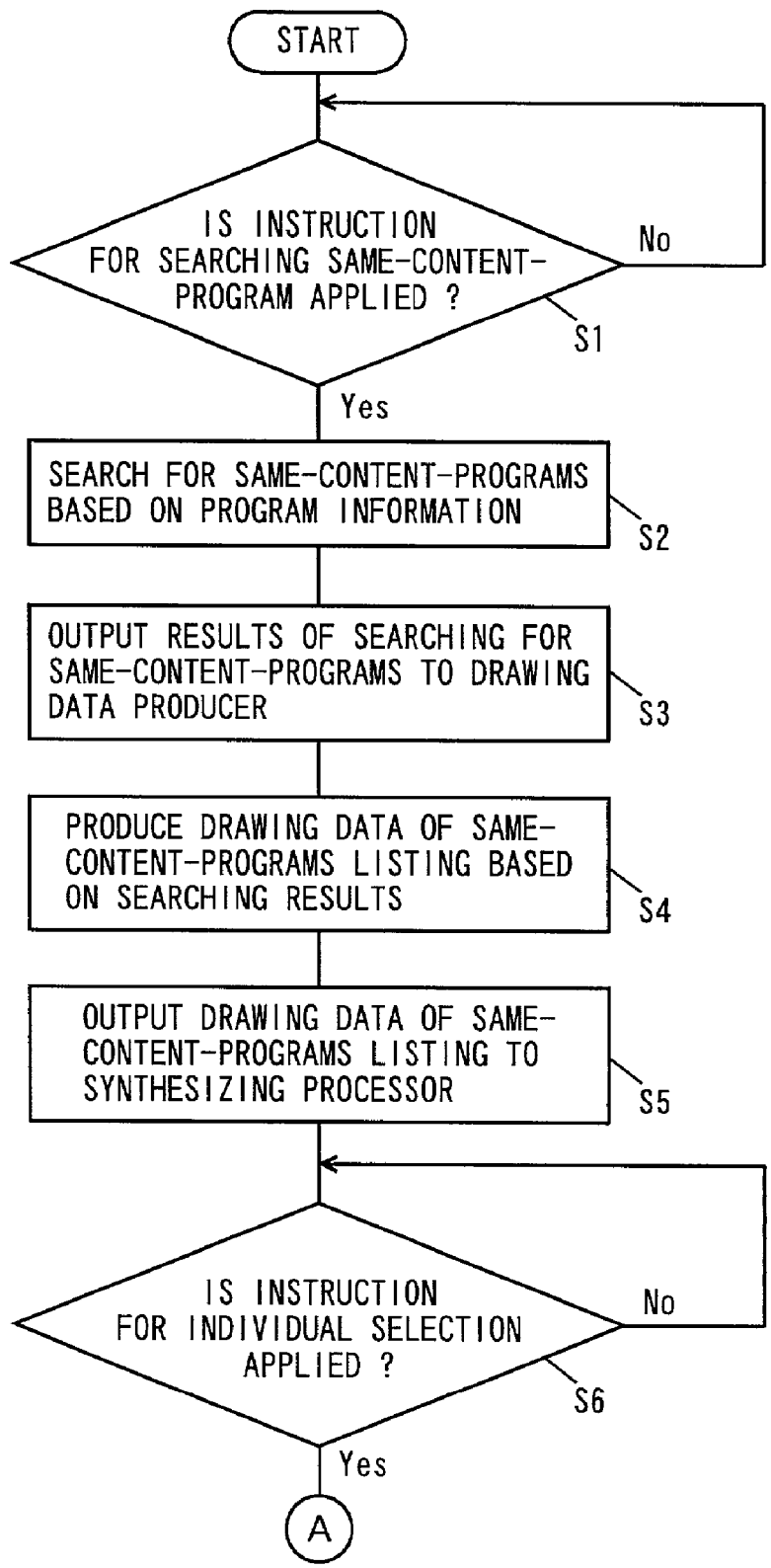
FIG. 2 is a flow chart showing the operation of a microcomputer in the television receiver of FIG. 1.
Figure 3:
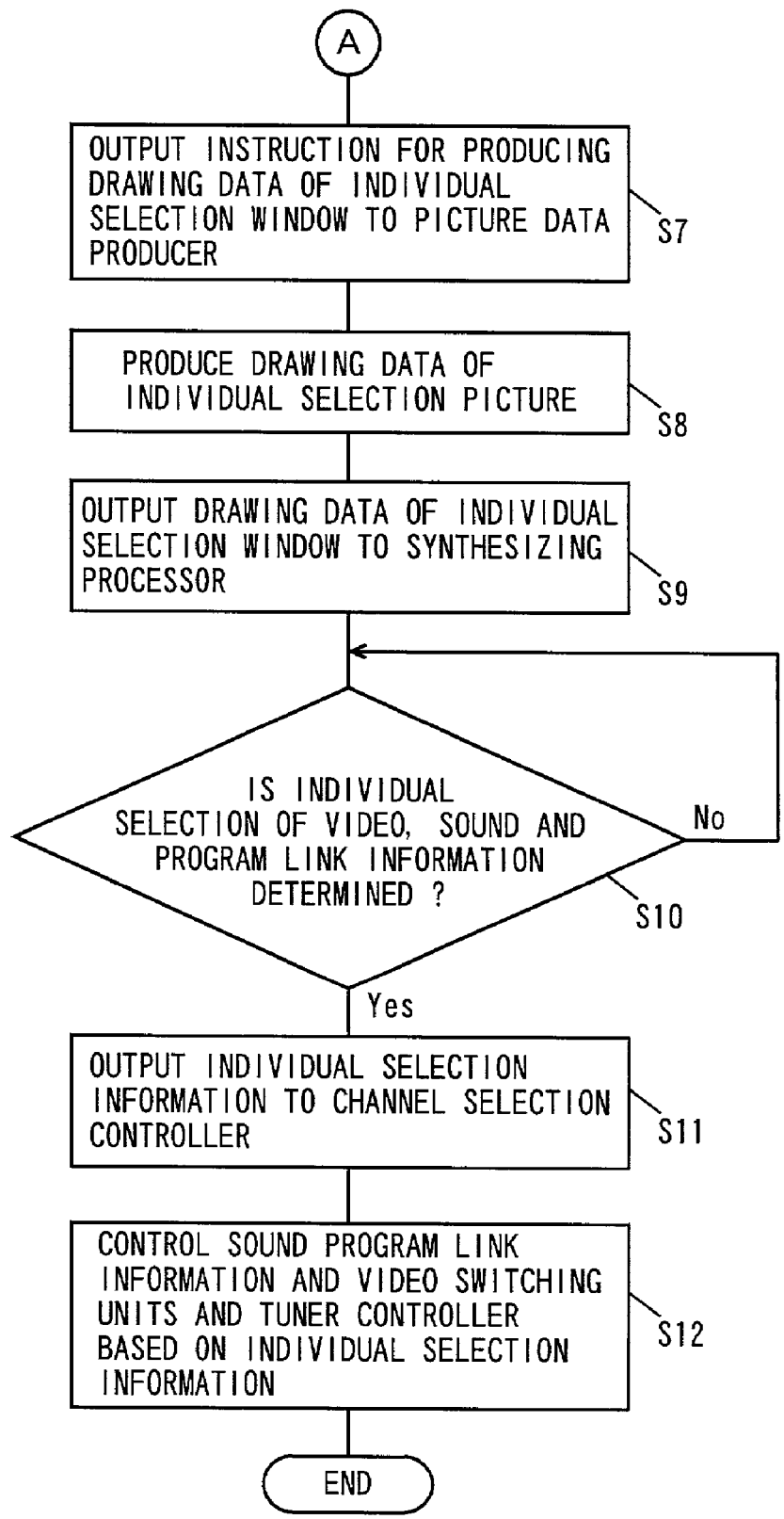
FIG. 3 is a flow chart showing the operation of the microcomputer in the television receiver of FIG. 1.
Figure 4:
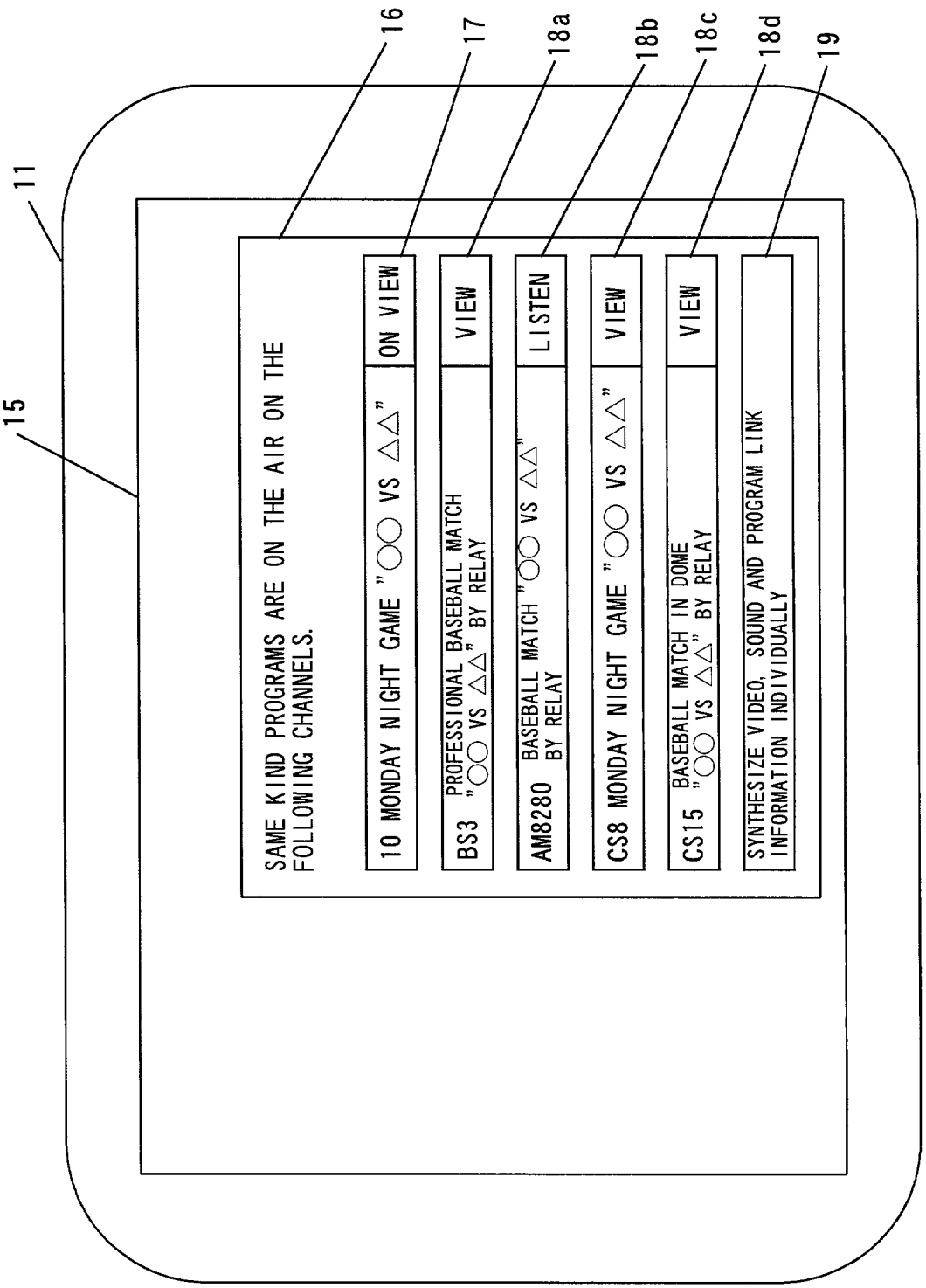
FIG. 4 is a diagram showing an example of a picture of the result of searching for programs of the same content displayed on a display device of the television receiver of FIG. 1.
Figure 5:
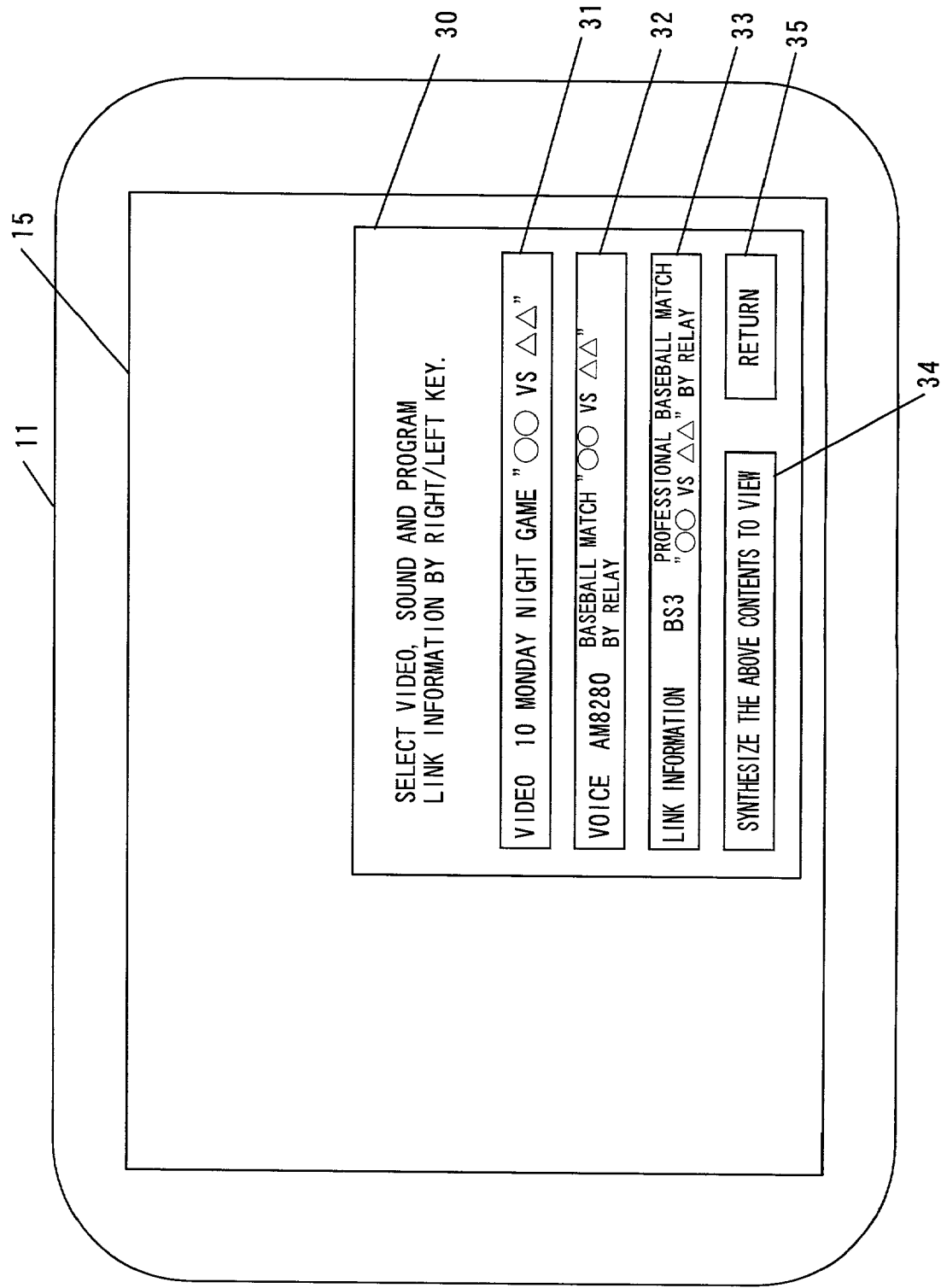
FIG. 5 is a diagram showing an example of an individual selection picture displayed on the display device of the television receiver of FIG. 1.
Figure 6:
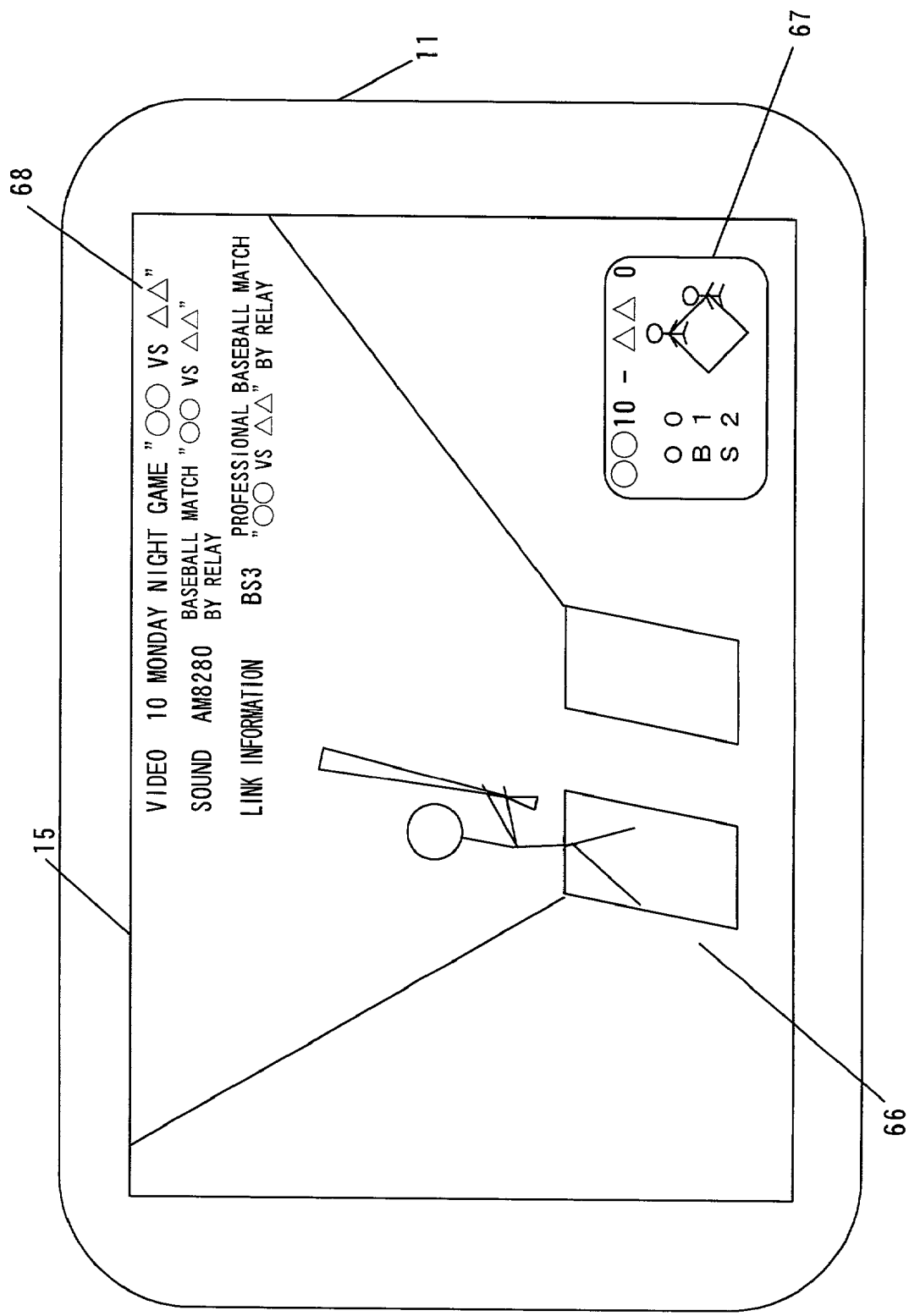
FIG. 6 is a diagram showing a picture displayed on the display device in the case where a video, a sound and program link information are individually selected in the television receiver of FIG. 1.

FIGS. 2 and 3 are flow charts showing the operation of the microcomputer in the television receiver of FIG. 1. FIG. 4 is a diagram showing an example of the picture showing the results of searching for the programs of the same content, displayed on the display device of the television receiver of FIG. 1. FIG. 5 is a diagram showing an example of an individual selection screen displayed on the display device of the television receiver of FIG. 1. FIG. 6 is a diagram showing a screen displayed on the display device in the case where a video, a sound and link information are individually selected in the television receiver of FIG. 1.

A description will now be made on the operation of the television receiver of FIG. 1 with reference to FIGS. 1 to 6.

When a user presses a same-content-program search button of the remote controller 200, the remote controller 200 transmits a remote control signal including an instruction for searching for programs of the same content. The remote control signal receiver 1 applies the received remote control signal to the microcomputer 2. The remote control signal analyzer 21 detects the remote control signal and analyzes the applied remote control signal to output an instruction for searching for programs of the same content to the same-content-program searching and individual selection controller 23 (step S1).

The same-content-program searching and individual selection controller 23 searches for programs of the same content on the basis of program information stored in a memory incorporated in the microcomputer 2 (step S2). After searching, the same-content-program searching and individual selection controller 23 outputs the results of searching for the programs of the same content to the drawing data producer 24 (step S3). The drawing data producer 24 produces drawing data of a picture listing the programs of the same content on the basis of the applied results of searching for the programs of the same content (step S4). The drawing data producer 24 outputs the produced drawing data of the picture listing the same content to the synthesizing processor 10 (step S5).

The synthesizing processor 10 synthesizes the drawing data of the picture listing the programs of the same content with a video signal of a program being viewed at present, so as to output a synthetic video signal to the display device 11.

At this time, a same-content-program list 16 is displayed on a screen 15 of the display device 11, as shown in FIG. 4. This list 16 includes a program-on-view display 17, a same-content-program displays 18a to 18d and an individual selection instruction display 19, and the display 17 of the program on view provides blinking display.

In this case, the program that the user is now viewing is a Monday night game "○○versusΔΔ" being broadcast on a ground wave 10 channel. Those extracted as programs of the same content as the program on view are a professional baseball match "603 ○versusΔΔ" being broadcast by relay on a BS3 channel, a baseball match "○○versusΔΔ" being broadcast by relay on an AM8280 channel, a Monday night game "○○versusΔΔ" being broadcast on a CS8 channel and a dome baseball match "○○versus ΔΔ" being broadcast on a CS15 channel.

The user confirms the programs of the same content as that of the program he or she is now viewing on the basis of the same-content-program list 16 displayed on the screen 15, and selects a program that he or she wants to view.

If the user wants to select a video, a sound and program link information respectively from the individual programs and to synthesize the selected ones to view, he or she makes the blinking display of the program-on-view display 17 shift to the individual selection instruction display 19 to let the display 19 blink by using an up/down shift key of the remote controller 200. After that, he or she presses an execution button of the remote controller 200. The remote controller 200 outputs a remote control signal including an instruction of individual selection.

The remote control signal analyzer 21 detects the remote control signal including the instruction for individual selection to supply the same-content-program searching and individual selection controller 23 with the instruction for individually selecting a video, a sound and program link information (step S6). The controller 23 supplies the drawing data producer 24 with an instruction for producing drawing data of the individual selection picture, while outputting again the results of searching for the programs of the same content to the drawing data producer 24 (step S7).

The drawing data producer 24 produces drawing data of the individual selection picture on the basis of the results of searching for the same-content-program (step S8). Further, the producer 24 outputs the produced drawing data of individual selection picture to the synthesizing processor 10 (step S9).

The synthesizing processor 10 synthesizes the video signal on view and the drawing data of the individual selection picture to provide the display device 11 with a synthetic video signal. The display device 11 displays the provided synthetic video signal as a video.

At this time, an individual selection picture 30 which is synthesized with the video of the program on view is displayed on the screen 15 of the display device 11, as shown in FIG. 5.

This individual selection screen 30 includes a video selection display 31 that displays program information of a video to be selected, a sound selection display 32 that displays program information of a sound to be selected, a program link information selection display 33 that displays program information of program link information to be selected, an individual selection determination display 34 that instructs the determination of individual selection, and a cancellation selection display 35 that cancels individual selection.

If the user selects a video that he or she wants to display, he or she makes the video selection display 31 blink by using an up/down shift button of the remote controller 200. Further, he or she makes the video selection display 31 display the program information of the video that he or she wants to select by using a right/left shift button.

If the user selects a sound that he or she wants to output, he or she makes the sound selection display 32 blink by using the up/down shift button of the remote controller 200, and then makes the sound selection display 32 display the program information of the sound that he or she wants to select by using the right/left shift button.

If the user selects program link information that he or she wants to display, he or she makes the program link information selection display 33 blink by using the up/down shift button, and then makes the program link information selection display 33 display the program information of the program link information that he or she wants to select, by using the right/left shift button.

In this case, the video selected by the user is the Monday night game "○○versusΔΔ" that is broadcast on the ground wave 10 channel. The sound selected by the user is the baseball match "○○versusΔΔ" that is broadcast by relay on the AM radio 8280 channel, and the selected program link information is "○○versusΔΔ" that is broadcast on the BS3 channel.

After making the video selection display 31, the sound selection display 32 and the program link information selection display 33 display the program information of the respective programs that the user wants to select, the user makes the individual selection determination display 34 blink by using the remote controller 200 and presses the execution button of the controller 200.

This causes a remote control signal including an instruction of individual selection determination to be transmitted from the remote controller 200 to the remote control signal receiver 1. The remote control signal receiver 1 provides the remote control code analyzer 21 with the remote control signal. The remote control code analyzer 21 analyzes the remote control signal to apply the instruction of individual selection determination to the same-content-program searching and individual selection controller 23 (step S10). The controller 23 supplies the channel selection controller 22 with individual selection information indicating the selected video, sound and program link information (step S11). The channel selection controller 22 controls the sound switching unit 3, the program link information switching unit 4, the video switching unit 5 and the tuner controller 9 on the basis of the supplied individual selection information step S12).

The tuner controller 9 provides the AM radio tuner 9*d* with an instruction for receiving an AM8280 broadcast signal through an antenna 20 on the basis of the control by the channel selection controller 22. Further, the tuner controller 9 provides the BS2 tuner 9*g* with an instruction for receiving a BS3 channel broadcast signal through the antenna 20. Also, the tuner controller 9 provides the ground wave 3 tuner 9*i* with an instruction for receiving a ground wave 10 channel broadcast signal through the antenna 20.

The AM radio tuner 9*d* receives an AM8280 broadcast signal through the antenna 20 to apply the received signal to the radio sound decoder 64. The radio sound decoder 64 decodes the AM8280 broadcast signal so as to extract an AM8280 sound signal and output the same to the sound switching unit 3.

The BS2 tuner 9*g* receives a BS3 channel broadcast signal through the antenna 1 to apply the received signal to the BS program link information decoder 72. The BS program link information decoder 72 decodes the BS3 channel broadcast signal so as to extract a BS3 channel program link information signal and output the same to the program link information switching unit 4.

The ground wave 3 tuner 9*i* receives a ground wave 10 channel broadcast signal through the antenna 1 to apply the received signal to the ground wave video decoder 81. The ground wave video decoder 81 decodes the ground wave 10 channel broadcast signal to apply a ground wave 10 channel video signal to the video switching unit 5.

The sound switching unit 3 switches the switch P to the contact SW4 on the basis of a control signal from the channel selection controller 22 so as to output to the speaker 12 the AM8280 sound signal applied from the radio sound decoder 64. The speaker 12 outputs the AM8280 sound signal as a sound.

The program link information switching unit 4 switches the switch Q to the contact SW6 on the basis of the control from the channel selection controller 22 so as to output to the program link information drawing data producer 25 the BS3 channel program link information signal applied from the BS link information decoder 72. The program link information drawing data producer 25 produces BS3 channel program link information drawing data on the basis of the BS3 channel program link information signal to output the produced data to the synthesizing processor 10.

The video switching unit 5 switches the switch R to the contact SW8 on the basis of a control signal from the channel selection controller 22 so as to output to the synthesizing processor 10 the ground wave 10 channel video signal applied from the ground wave video decoder 81.

The synthesizing processor 10 synthesizes the BS3 channel program link information drawing data applied from the program link information drawing data producer 25 and the ground wave 10 channel video signal applied from the video switching unit 5 to output a synthetic video signal to the display device 11.

Consequently, as shown in FIG. 6, the video 66 of the Monday night game "○○versusΔΔ" that is broadcast on the ground wave 10 channel and the program link information 67 of the professional baseball match "○○versusΔΔ" that is broadcast by relay on the BS3 channel are displayed on the screen 15 of the display device 11. Also, the sound of the baseball match "○○versusΔΔ" that is broadcast on the AM radio 8280 is output from the speaker 12.

Further, individual selection information 68 indicating the selected video, sound and program link information on view is displayed on the screen 15 of the display device 11.

If the user cancels the individual selection of the video, sound and program link information, on the screen 15 of FIG. 5, he or she makes the cancellation selection display 35 blink and presses the execution button of the remote controller 200.

On the other hand, if the user wants to select and view the Monday night game "○○versusΔΔ" being broadcast on the CS8 channel without individually selecting any video, sound and program link information, in FIG. 4, he or she shifts the blinking of the program-on-view display 17 to the same-content-program display 18*c* to let the display 18*c* blink by using the up/down shift key of the remote controller 200, and then presses a selection determination button of the remote controller 200.

This causes a remote control signal including an instruction for determination of channel selection to be transmitted from the remote controller 200 to the remote control signal receiver 1. The remote control signal receiver 1 outputs the received remote control signal to the remote control code analyzer 21. The remote control code analyzer 21 analyzes the remote control signal to output to the channel selection controller 22 an instruction for changing the channel selection of a video, a sound and program link information to the CS8 channel.

The channel selection controller 22 controls the sound switching unit 3, the program link information switching unit 4, the video switching unit 5 and the tuner controller 9 on the basis of the instruction. The tuner controller 9 provides the CS1 tuner 9*c*, the CS2 tuner 9*h* and the CS3 tuner 9*k* with an instruction for receiving a CS8 channel broadcast signal through the antenna 20, on the basis of the control by the channel selection controller 22.

The CS1 tuner 9*c* receives the CS8 channel broadcast signal through the antenna 20 to apply the received signal to the CS sound decoder 63. The CS sound decoder 63 decodes the CS8 channel broadcast signal to extract a CS8 channel sound signal and output the same to the sound switching unit 3.

The CS2 tuner 9*h* receives the CS8 channel broadcast signal through the antenna 20 to apply the received signal to the CS link information decoder 72. The CS program link information decoder 72 decodes the CS8 channel broadcast signal to extract a CS8 channel program link information signal and output the same to the program link information switching unit 4.

The CS3 tuner 9*k* receives the CS8 channel broadcast signal through the antenna 20 to apply the received signal to the CS video decoder 83. The CS video decoder 83 decodes the CS8 channel broadcast signal to extract a CS8 channel video signal and output the same to the video switching unit 5.

The sound switching unit 3 switches the switch P to the contact SW3 on the basis of a control signal from the channel selection controller 22 so as to output the speaker 12 the CS8 channel sound signal applied from the CS sound decoder 63. The speaker 12 outputs the CS8 channel sound signal as a sound.

The program link information switching unit 4 switches the switch Q to the contact SW7 on the basis of the control signal from the channel selection controller 22 so as to output to the program link information drawing data producer 25 the CS8 channel program link information signal applied from the CS program link information decoder 73. The program link information drawing data producer 25 produces CS8 channel program link information drawing data on the basis of the CS8 channel program link information signal to output the produced data to the synthesizing processor 10.

The video switching unit 5 switches the switch R to the contact SW10 on the basis of the control signal from the channel selection controller 22 to output to the synthesizing processor 10 the CS8 channel video signal applied from the CS video decoder 83.

The synthesizing processor 10 synthesizes the CS8 channel program link information drawing data applied from the program link information drawing data producer 25 and the CS8 channel video signal applied from the video switching unit 5 to output a synthetic video signal to the display device 11.

Accordingly, the video and the program link information of the Monday night game "○○versusΔΔ" that is broadcast on the CS8 channel are displayed on the display device 11, and the sound is output from the speaker 1.

As has been described above, in the structure of the television receiver according to this embodiment, the provision of such a function that a video, a sound and program link information can be individually selected makes it possible for the user to select his or her favorite video, sound and program link information from individual programs and freely combine the selected ones to view.

In this embodiment, the video switching unit 5, the sound switching unit 3 and the program link information switching unit 4 correspond to the first selection means, the second selection means and the third selection means, respectively.

The tuner controller 9, the video decoder 8, the sound decoder 6 and the program link information decoder 7 correspond to the receiving means, the video signal extraction means, the sound signal extraction means and the program link information signal extraction means, respectively. The same-content-program searching and individual selection controller 23 corresponds to the same-content-program selection control means. The display device 11 and the speaker 12 correspond to the display device and the sound output device, respectively.

Figure 7:
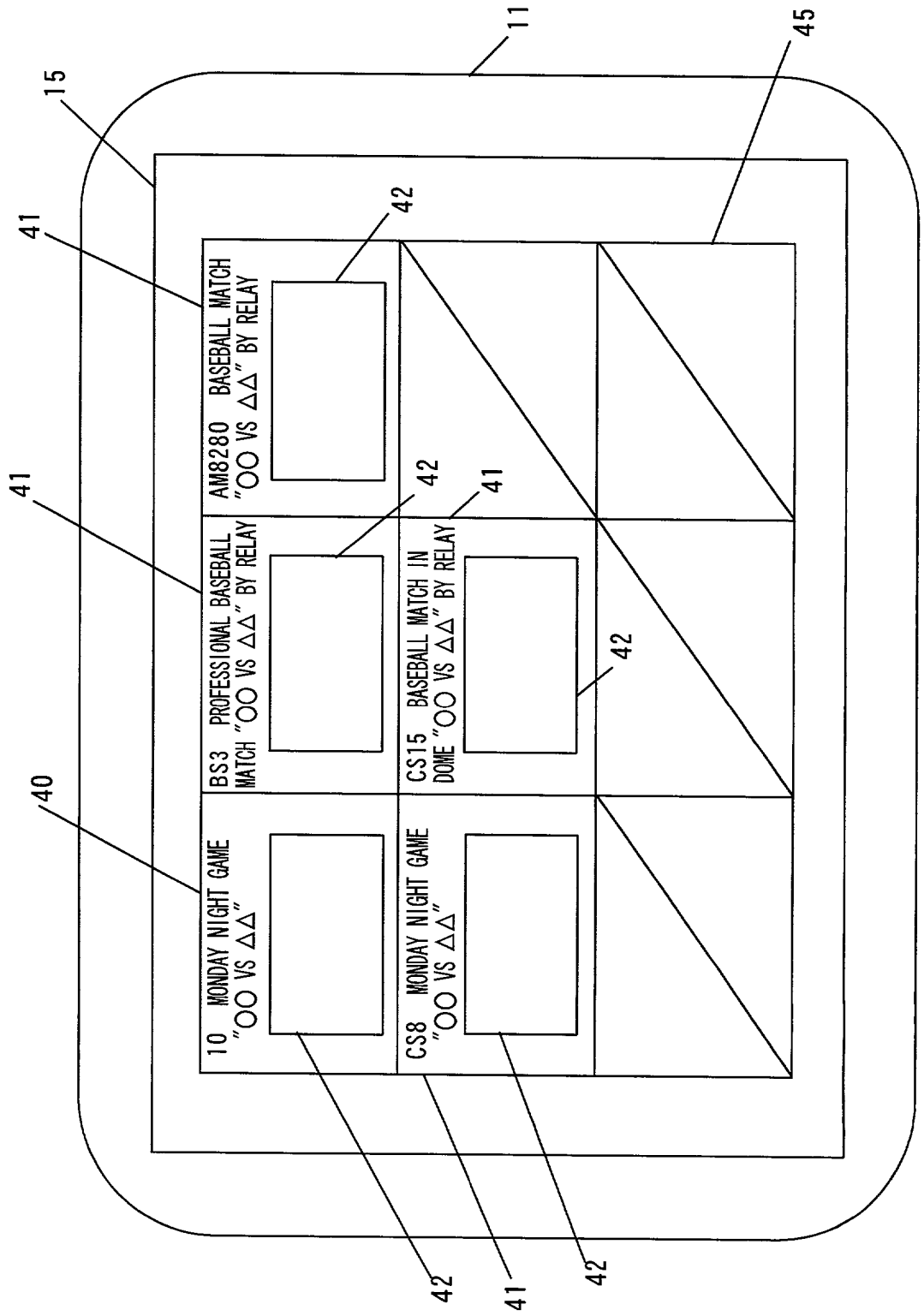
FIG. 7 is a diagram showing an example of an individual selection setting display picture displayed on a display device of a television receiver according to a second embodiment of the present invention.

FIG. 7 is a diagram showing an example of an individual selection setting display screen displayed on a display device of a television receiver according to a second embodiment of the present invention. The entire structure of the television receiver according to the second embodiment is the same as the structure shown in FIG. 1.

In this case, after searching for programs of the same content, the same-content-program searching and individual selection controller 23 outputs the results of searching to the drawing data producer 24, while it provides the channel selection controller 22 with an instruction signal that receives broadcast signals of the programs searched as the programs of the same content. The channel selection controller 22 controls the tuner controller 9 on the basis of the instruction.

The tuner controller 9 provides the ground wave 3 tuner 9i with an instruction for receiving a ground wave broadcast signal of the ground wave 10 channel searched by the same-content-program searching. Also, the tuner controller 9 provides the BS3 tuner 9j with an instruction for receiving a BS broadcast signal of the BS3 channel searched by the same-content-program searching. Moreover, the tuner controller 9 provides the CS3 tuner 9k with an instruction for receiving CS broadcast signals of the CS8 and CS15 channels searched by the same-content-program searching.

The ground wave 3 tuner 9i receives the ground wave 10 channel broadcast signal to output the same to the ground wave video decoder 81. The ground wave video decoder 81 decodes the ground wave 10 channel broadcast signal so as to extract a ground wave 10 channel video signal and apply the same to the video switching unit 5.

The BS3 tuner 9j receives the BS3 channel broadcast signal to output the same to the BS video decoder 82. The BS video decoder 82 decodes the BS3 channel broadcast signal so as to extract a BS3 channel video and apply the same to the videoswitching unit 5.

The CS3 tuner 9k receives the CS broadcast signals of the CS8 and CS15 channels in turn to output the received signals to the CS video decoder 83. The CS video decoder 83 decodes the CS broadcast signals of the CS8 and CS15 channels so as to extract CS video signals of the CS8 and CS15 channels and apply the same to the video switching unit 5.

The channel selection controller 22 supplies the video switching unit 5 with an instruction for switching the switch R to the contacts SW8 to SW10 in turn. The video switching unit 5 switches the switch R to the contacts SW8 to SW10 in turn on the basis of the instruction to output in turn to the synthesizing processor 10 the ground wave 10 channel ground wave video signal, the BS3 channel video signal, the CS8 channel video signal and the CS15 channel video signal applied from the video decoder 8.

The synthesizing processor 10 synthesizes the same-content-program listing screen drawing data applied from the drawing data producer 24, the ground wave 10 channel video signal, the BS3 channel video signal, the CS8 channel video signal and the CS15 channel video signal so as to output a synthetic video signal to the display device 11. The display device 11 displays the synthetic video signal as a video.

Accordingly, program information is displayed on a program-on-view information display 40 and a same-content-program display 41, and a video on the air is displayed on a video display 42, in a same-content-program list 45 displayed on the screen 15 of the display device 11, as shown in FIG. 7. This makes it possible for the user to confirm the programs of the same content while viewing the program link information of the programs of the same content and the video being broadcast.

When the programs of the same content are those of AM radio and FM radio broadcasting, a comment "Broadcasting Sound Only" is displayed on the video display 42.

Figure 8:
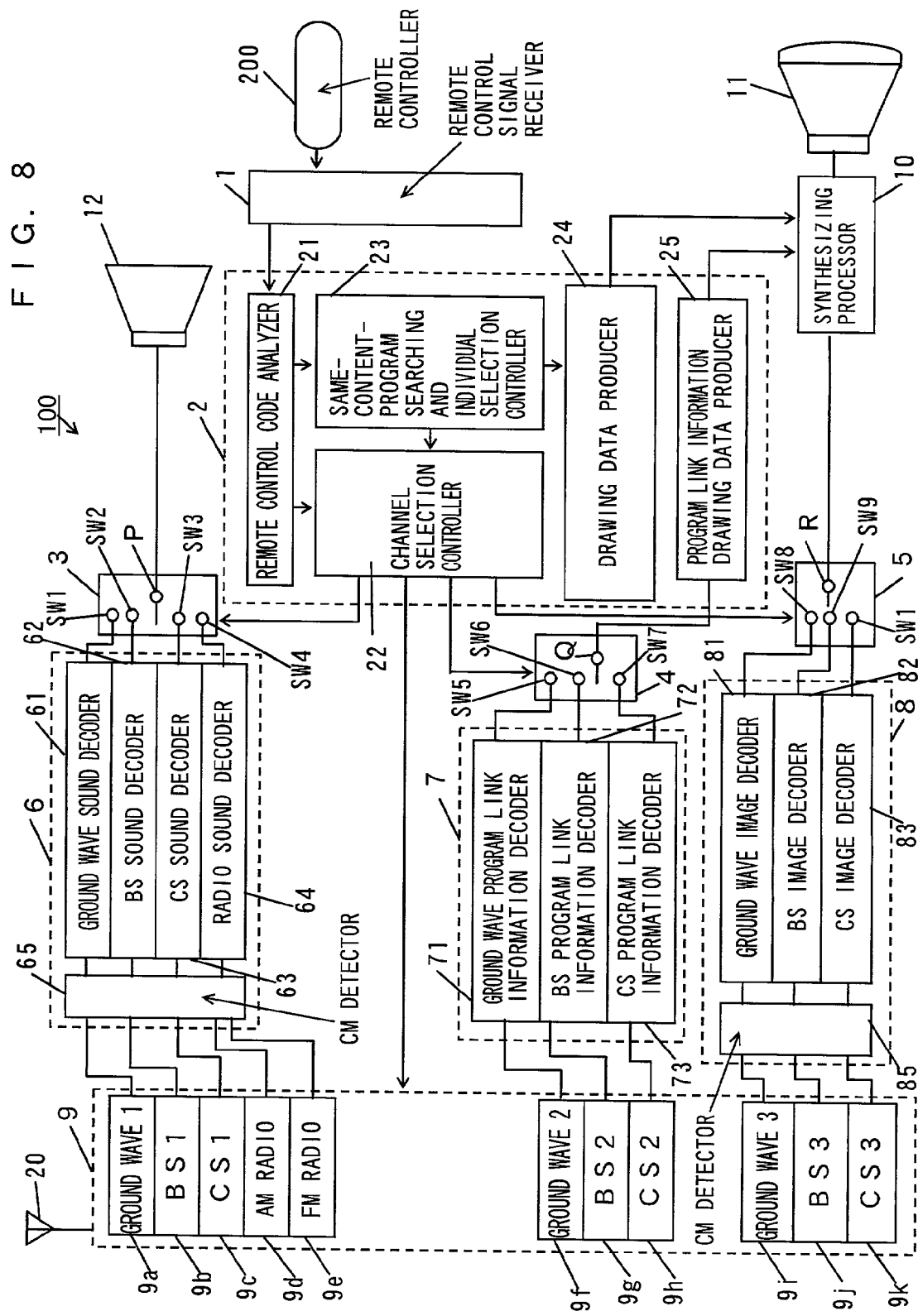
FIG. 8 is a block diagram showing the structure of a television receiver according to a third embodiment of the present invention.

FIG. 8 is a block diagram showing the structure of a television receiver according to a third embodiment of the present invention.

In the first embodiment, when the user is viewing a program by individually selecting and synthesizing a video, a sound and program link information, there occurs disagreement between the video and the sound at the time when either the program of which video is selected or the program of which sound is selected turns into a CM (commercial) break. Thus, in the television receiver according to the third embodiment, CM detectors 65 and 85 are provided, respectively, in the sound decoder 6 and the video decoder 8 of the television receiver 100 according to the first embodiment, as shown in FIG. 8.

These CM detectors 65 and 85 detect the variation of broadcast signals applied from the tuner controller 9 to determine whether the received signals are on programs or on CM breaks.

Figure 9:
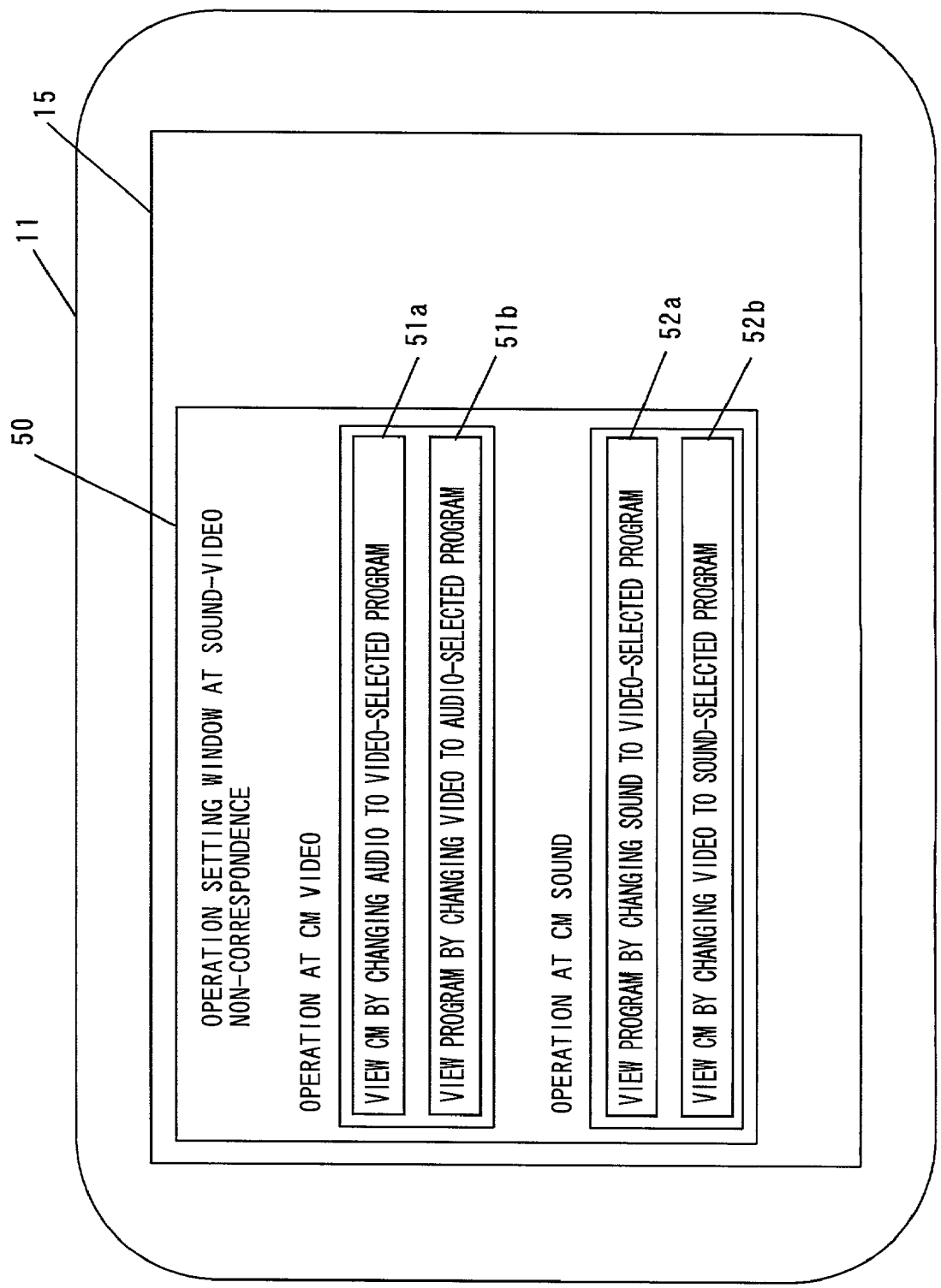
FIG. 9 is a diagram of a sound-video disagreement operation setting picture displayed on a display device of the television receiver of FIG. 8.
Figure 10:
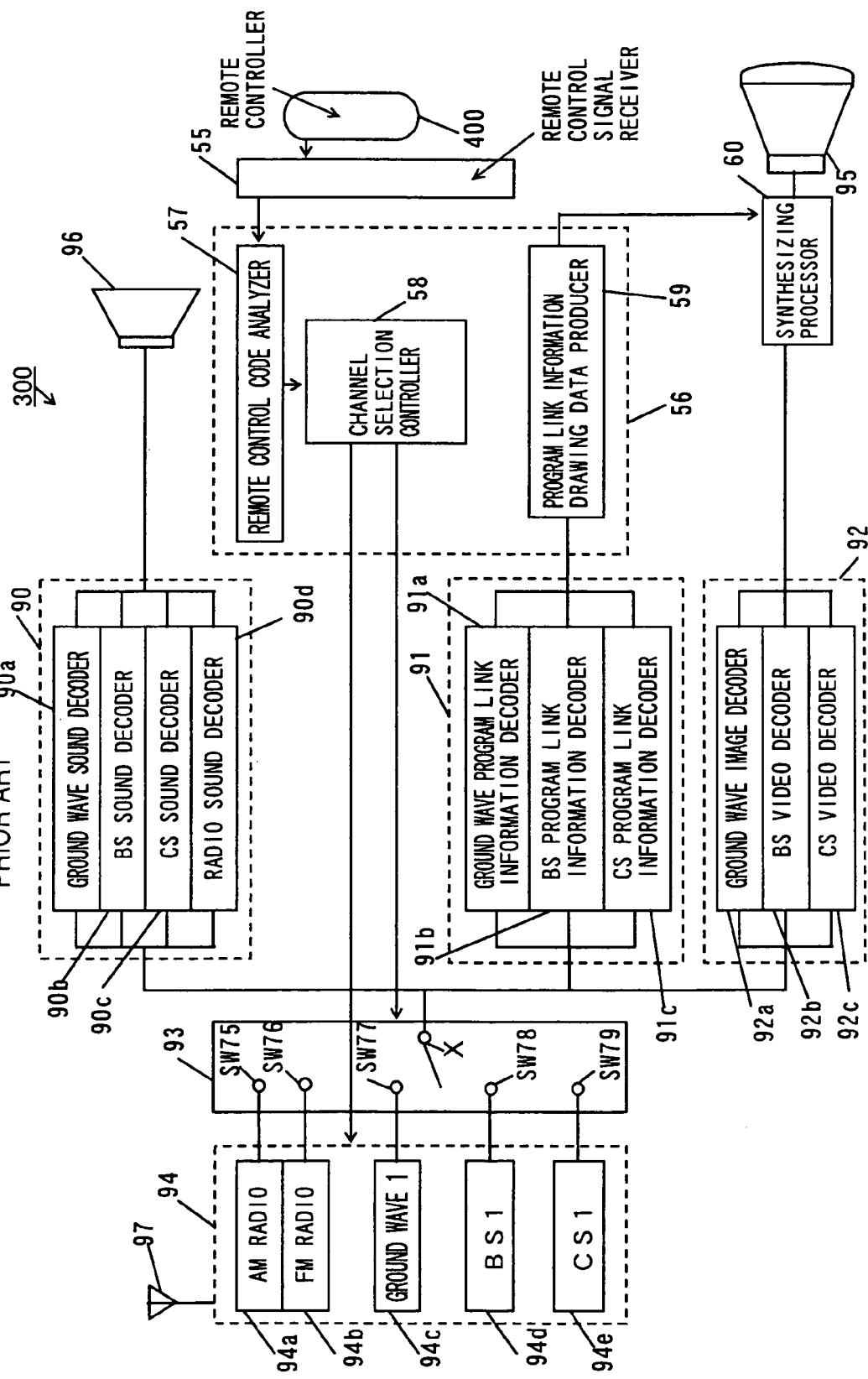
FIG. 10 is a block diagram showing the structure of a conventional television receiver.

FIG. 9 is a diagram showing a sound-video disagreement operation setting picture displayed on the display device of the television receiver of FIG. 8.

The user calls a sound-video disagreement operation setting picture 50 shown in FIG. 9 to make it appear on the screen 15 of the display device 11 by using the remote controller 200. If a video or a sound on view turns to a CM break, the user can set so that he or she may view with priority either the program being broadcast or the CM break.

If the program of which video is selected turns to the CM break, for example, the user makes a video-CM operation setting display 51a blink by using the remote controller 200, and presses the execution button of the remote controller 200. Accordingly, he or she can select and output the sound of the program, of which video is selected.

Conversely, if the user makes a video-CM operation setting display 51b blink by using the remote controller 200 and presses the execution button of the remote controller 200, he or she can select and display the video of the program, of which sound is selected.

On the other hand, if the program of which sound is selected turns to the CM break, the user makes a sound-CM operation setting display 52b blink by using the remote controller 200, and presses the execution button of the remote controller 200. Accordingly, he or she can select and display the video of the program, of which sound is selected.

Conversely, if the user makes a sound-CM operation setting display 52a blink by using the remote controller 200 and presses the execution button of the remote controller 200, he or she can select and output the sound of the program, of which video is selected.

Consideration will now be made on the case where the video, the sound and the program link information of the program on view are selected by setting of individual selection shown in FIG. 5. That is, it is assumed that the video of the program on the ground wave 10 channel is displayed, the sound of the program on AM8280, and the program link information of the program on the BS3 channel is displayed. When the program on the ground wave 10 channel changes to the CM break, the CM detector 85 shown in FIG. 8 conveys the change of the program to the CM break to the channel selection controller 22. The channel selection controller 22 controls the sound switching unit 3 and the tuner controller 9. The sound switching unit 3 switches the switch P from the contact SW4 to SW1.

Further, the tuner controller 9 stops receiving the AM8280 broadcast signal from the AM radio tuner 9d and provides an instruction for receiving the ground wave 10 channel broadcast signal from the ground wave 1 tuner 9a.

Accordingly, if the program on the ground wave 10 channel, selected as the video turns to the CM break, the sound output from the speaker 12 is switched from the sound on AM8280 to the sound on the ground wave 10 channel, thereby enabling viewing of the CM break on the ground wave 10 channel.

If the program selected as the sound changes to the CM break, the CM detector 65 conveys the change of the program to the CM break to the channel selection controller 22. The channel selection controller 22 controls the sound switching unit 3 and the tuner controller 9. The sound switching unit 3 switches the switch P from the contact SW4 to SW1.

Further, the tuner controller 9 stops receiving the AM8280 broadcast signal from the AM radio tuner 9d and provides an instruction for receiving the ground wave 10 channel broadcast signal from the ground wave 1 tuner 9a.

Accordingly, if the AM8280 selected as the sound changes to the CM break, the sound output from the speaker 12 is switched from the sound on AM8280 to the sound on the ground wave 10 channel, thereby enabling viewing of the program on the ground wave 10 channel.

As has been described above, in the case where the user is viewing the video, sound and program link information individually selected and combined in the television receiver including the CM detectors according to this embodiment, when either the program selected as the video or the program selected as the sound changes to the CM break, the disagreement between the video and the sound can be prevented by switching either the individually selected video or sound.

The CM detectors 65 and 85 correspond to the broadcast signal coincidence control means in this embodiment.

The invention claimed is:

1. A television receiver, comprising:
a first selector that selects a broadcast signal for display of a video;
a second selector that selects a broadcast signal for output of a sound independently from the broadcast signal for display of a video;
a third selector that selects a broadcast signal for display of program link information independently from the broadcast signal for display of a video and the broadcast signal for output of a sound, wherein the program link information is displayable information that relates to a program and is included in the broadcast signal together with a video signal and a sound signal for said program;
a receiver that receives the broadcast signals selected by said first selector as a first broadcast signal, selected by said second selector as a second broadcast signal and selected by said third selector as a third broadcast signal;
a signal extractor that extracts a video signal from the first broadcast signal, a sound signal from the second broadcast signal and program link information from the third broadcast signal received by said receiver;
a combiner that combines the video signal and program link information signal extracted by said signal extractor with each other and outputs the combined video signal;
a display device that displays as a video the combined video signal output from said combiner; and
a sound output device that outputs as a sound the sound signal extracted by said signal extractor.

2. A television receiver comprising:
a first selector that selects a broadcast signal for display of a video;
a second selector that selects a broadcast signal for output of a sound independently from the broadcast signal for display of a video;
a third selector that selects a broadcast signal for display of program link information, wherein the program link information is displayable information that relates to a program and is included in the broadcast signal together with a video signal and a sound signal for said program;

a receiver that receives the broadcast signals selected by said first, second and third selector as first, second and third broadcast signals, respectively;

a signal extractor that extracts a video signal, a sound signal and program link information, respectively, from the first, second and third broadcast signals received by said receiver;

a combiner that combines the video signal and program link information signal extracted by said signal extractor with each other and outputs the combined video signal;

a display device that displays as a video the combined video signal output from said combiner; and sound output device that outputs as a sound the sound signal extracted by said signal extractor, wherein said receiver includes a first receiver that receives the broadcast signal selected by said first selector as the first broadcast signal, a second receiver that receives the broadcast signal selected by said second selector as the second broadcast signal, and a third receiver that receives the broadcast signal selected by said selector as the third broadcast signal; and said signal extractor includes a video signal extractor that extracts the video signal from the first broadcast signal received by said first receiver, a sound signal extractor that extracts the sound signal from the second broadcast signal received by said second receiver, and a program link information signal extractor that extracts the program link information signal from the third broadcast signal received by said third receiver.

3. The television receiver according to claim 2, wherein said first receiver includes a plurality of first tuners that receive broadcast signals of the same or different broadcast systems, said second receiver includes a plurality of second tuners that receive broadcast signals of the same or different broadcast systems, said third receiver includes a plurality of third tuners that receive broadcast signals of the same or different broadcast systems, said video signal extractor includes a plurality of first decoders that extract video signals, respectively, from the broadcast signals of the same or different broadcast systems, received by said plurality of first tuners, said sound signal extractor includes a plurality of second decoders that extract sound signals, respectively, from the broadcast signals of the same or different systems, received by said plurality of second tuners, and said program link information extractor includes a plurality of third decoders that extract program link information signals, respectively, from the broadcast signals of the same or different broadcast systems, received by said plurality of third tuners.

4. The television receiver according to claim 2, wherein said first receiver includes at least one of a ground wave broadcast tuner that receives a ground wave broadcast signal and a satellite broadcast tuner that receives a satellite broadcast signal, said second receiver includes at least one of a ground wave broadcast tuner that receives a ground wave broadcast signal, a satellite broadcast tuner that receives a satellite broadcast signal, and a radio broadcast tuner that receives a radio broadcast signal, said third receiver includes at least one of a ground wave broadcast tuner that receives a ground wave broadcast signal and a satellite broadcast tuner that receives a satellite broadcast signal, said video signal extractor includes at least one of a ground wave broadcast video decoder and a satellite broadcast video decoder provided corresponding to the ground wave broadcast tuner or the satellite broadcast tuner, said sound signal extractor includes at least one of a ground wave broadcast sound decoder, a satellite broadcast sound decoder or a radio broadcast sound decoder provided corresponding to the ground wave broadcast tuner, the satellite broadcast tuner and the radio broadcast tuner, and said program link information signal extractor includes at least one of a ground wave broadcast program link information decoder and a satellite broadcast program link information decoder provided corresponding to the ground wave broadcast tuner or the satellite broadcast tuner.

5. A television receiver, comprising:

a first selector that selects a broadcast signal for display of a video;

a second selector that selects a broadcast signal for output of a sound independently from the broadcast signal for display of a video;

a third selector that selects a broadcast signal for display of program link information, wherein the program link information is displayable information that relates to a program and is included in the broadcast signal together with a video signal and a sound signal for said program;

a receiver that receives the broadcast signals selected by said first, second and third selectors as first, second and third broadcast signals, respectively;

a signal extractor that extracts a video signal, a sound signal and program link information, respectively, from the first, second and third broadcast signals received by said receiver;

a combiner that combines the video signal and program link information signal extracted by said signal extractor with each other and outputs the combined video signal;

a display device that displays as a video the combined video signal output from said combiner;

a sound output device that outputs as a sound the sound signal extracted by said signal extractor;

a program information storage that stores program information of a program to be broadcast; and a same-content-program searcher that searches for programs of the same content on the basis of the program information stored in said program information storing means.

6. The television receiver according to claim 5, further comprising:

a same-content-program display controller that displays on said display device the programs of the same content searched by said same-content-program searcher.

7. The television receiver according to claim 6, further comprising:

a same-content-program selection controller that controls the selecting operation to be carried out by said first, second and third selectors on the basis of the programs of the same content displayed by said same-content-program searcher.

8. A television receiver comprising:
a first selector that selects a broadcast signal for display of a video;
a second selector that selects a broadcast signal for output of a sound independently from the broadcast signal for display of a video;
a third selector that selects a broadcast signal for display of program link information, wherein the program link information is displayable information that relates to a program and is included in the broadcast signal together with a video signal and a sound signal for said program;
a receiver that receives the broadcast signals selected by said first, second and third selectors as first, second and third broadcast signals, respectively;
a signal extractor that extracts a video signal, a sound signal and program link information, respectively, from the first, second and third broadcast signals received by said receiver;
a combiner that combines the video signal and program link information signal extracted by said signal extractor with each other and outputs the combined video signal;
a display device that displays as a video the combined video signal output from said combiner;
a sound output device that outputs as a sound the sound signal extracted by said signal extractor; and
a broadcast signal coincidence controller that controls for controlling said first and second selectors so that the first broadcast signal and the second broadcast signal received by said receiver become coincident with each other when the program based on said first broadcast signal or said second broadcast signal changes to a commercial break.

9. The television receiver according to claim 8, further comprising:
a setter that sets the television receiver in a mode that a video and a sound of the commercial break are output or a mode that a video and a sound of the program are output when the program based on said first or second broadcast signal received by said receiver changes to the commercial break,
wherein said broadcast signal coincidence controller controls said first and second selectors so that said first and second broadcast signals become coincident with each other in accordance with said set mode.

10. A method of receiving a broadcast signal, comprising the steps of:
selecting a broadcast signal for display of a video;
selecting a broadcast signal for output of a sound independently from the broadcast signal for display of a video;
selecting a broadcast signal for display of program link information independently from the broadcast signal for display of a video and the broadcast signal for output of a sound, wherein the program link information is displayable information that relates to a program and is included in the broadcast signal together with a video signal and a sound signal for said program;
receiving said broadcast signal for display of the video as a first broadcast signal, said broadcast signal for output of the sound as a second broadcast signal and said broadcast signal for display of the program link information as a third broadcast signal;
extracting a video signal from the first broadcast signal, a sound signal from the second broadcast signal and program link information from the third broadcast signal;
combining said extracted video signal and said program link information signal with each other and outputting the combined video signal;
displaying said combined video signal as videos; and
outputting said extracted sound signal as a sound.

11. A method of receiving a broadcast signal, comprising the steps of:
selecting a broadcast signal for display of a video;
selecting a broadcast signal for output of a sound independently from the broadcast signal for display of a video;
selecting a broadcast signal for display of program link information, wherein the program link information is displayable information that relates to a program and is included in the broadcast signal together with a video signal and a sound signal for said program;
receiving said broadcast signal for display of the video, said broadcast signal for output of the sound and said broadcast signal for display of the program link information as first, second and third broadcast signals, respectively;
extracting a video signal, a sound signal and program link information, respectively, from said received first, second and third broadcast signals;
combining said extracted video signal and said program link information signal with each other and outputting the combined video signal;
displaying said combined video signal as videos;
outputting said extracted sound signal as a sound;
storing program information of a program to be broadcast; and
searching for programs of the same content on the basis of said stored information.

12. The method according to claim 11, further comprising the step of displaying said searched programs of the same content.

13. The method according to claim 12, further comprising the step of controlling the selecting operation of said broadcast signals on the basis of said displayed programs of the same content.

14. A method of receiving a broadcast signal, comprising the steps of:
selecting a broadcast signal for display of a video;
selecting a broadcast signal for output of a sound independently from the broadcast signal for display of a video;
selecting a broadcast signal for display of program link information, wherein the program link information is displayable information that relates to a program and is included in the broadcast signal together with a video signal and a sound signal for said program;
receiving said broadcast signal for display of the video, said broadcast signal for output of the sound and said broadcast signal for display of the program link information as first, second and third broadcast signals, respectively;
extracting a video signal, a sound signal and program link information, respectively, from said received first, second and third broadcast signals;
combining said extracted video signal and said program link information signal with each other and outputting the combined video signal;
displaying said combined video signal as videos;

outputting said extracted sound signal as a sound; and controlling the selecting operation of said broadcast signals so that the received first and second broadcast signals become coincident with each other when a program based on said first or second broadcast signal changes to a commercial break.

15. The method according to claim 14, further comprising the step of setting the television receiver in a mode that a video and a sound of the commercial break are output or a mode that a video and a sound of the program are output when the program based on the received first or second broadcast signal changes to the commercial break, wherein said step of controlling the selecting operation of said broadcast signals includes the step of controlling the selecting operation of said first and second broadcast signals so that said broadcast signals become coincident with each other in accordance with said set mode.

* * * * *